UNITED STATES PATENT OFFICE.

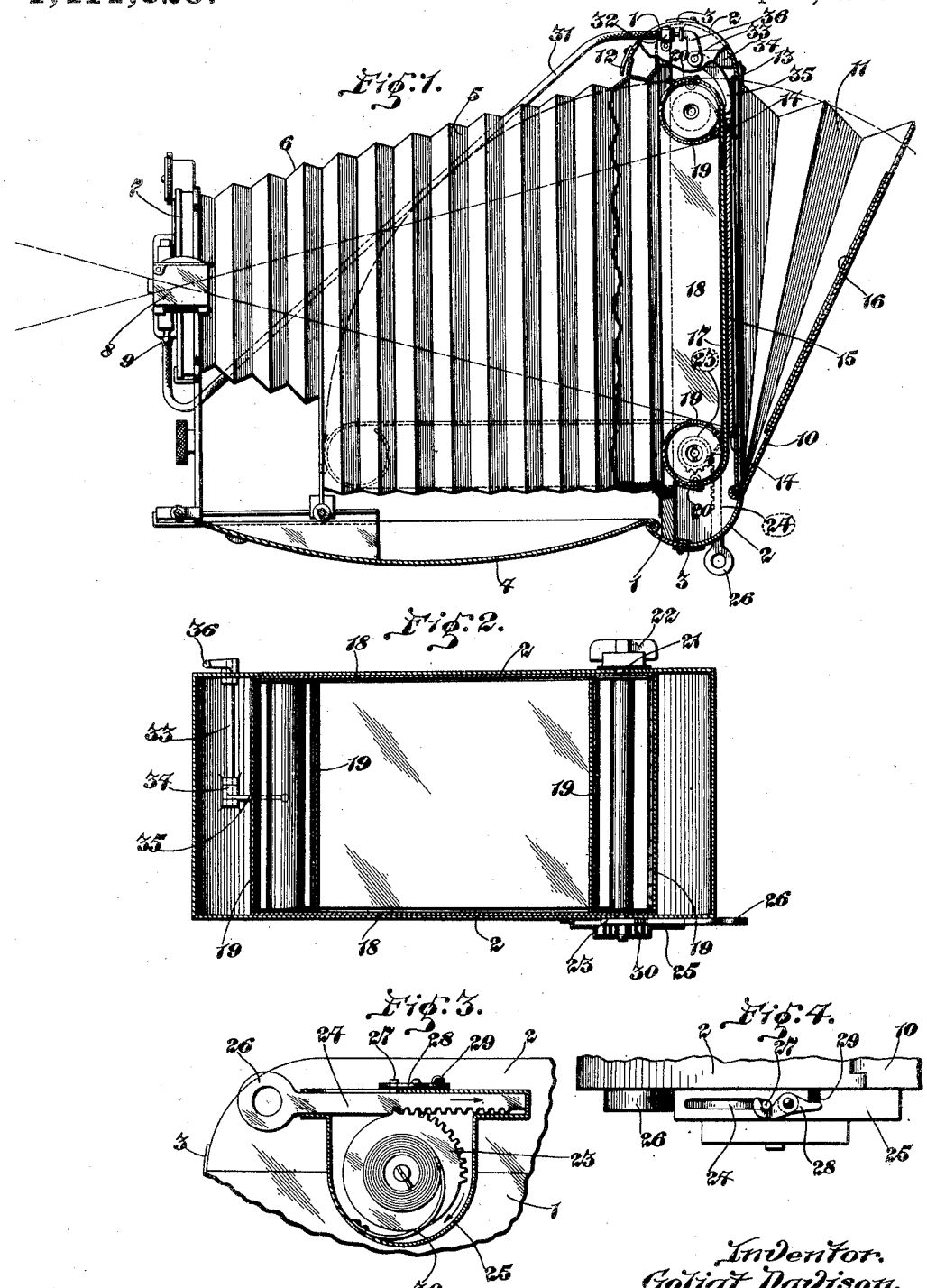

GOLIAT DAVISON, OF ST. LOUIS, MISSOURI.

CAMERA.

1,411,325.   Specification of Letters Patent.   Patented Apr. 4, 1922.

Application filed November 6, 1919. Serial No. 336,092.

*To all whom it may concern:*

Be it known that I, GOLIAT DAVISON, a subject of the King of Rumania, residing at the city of St. Louis and State of Missouri, have invented a new and useful Improvement in Cameras, of which the following is a specification.

This invention relates to improvements in cameras and consists in the novel construction hereinafter disclosed.

An object of the invention is to provide a camera utilizing film rolls, the camera being so that it may be focused without exposing the film.

Another object of the invention is to provide a camera including a film holder adapted to be moved out of exposure position, to permit the focusing of the camera while the film is protected from the light, and to return the film holder to exposure position and to operate the camera shutter as an incident to the return of the film holder to such exposure position.

Additional advantages inherent in the invention will be understood from the following detailed description thereof taken in connection with the accompanying drawings, in which—

Fig. 1 is a side elevation of the camera partially in section.

Fig. 2 is a vertical section through the camera illustrating particularly the film holder.

Fig. 3 is a fragmentary section illustrating the latching mechanism for holding the film holder out of exposure position, and the mechanism for returning the film holder to exposure position, and Fig. 4 is a fragmentary view further illustrating the same parts.

The box of the camera includes two interfitting sections 1 and 2, adapted to be releasably connected together by latches 3, the matching edges of the openings being arranged to overlap and to interlock so as to make a light tight joint between the two sections.

The front section is provided with a hinged front wall 4, that is adapted to fold outwardly and to constitute a bottom support for the bellows that is made in two sections 5 and 6.

The front section of the bellows 6 carries at its front end the lens frame 7, and is arranged to be expanded or contracted to properly focus the camera. A view finder 8, of the usual construction, may be mounted upon the lens frame if desired. The lens opening is controlled by shutter mechanism 9, of usual construction.

The section 2 has a hinged back wall 10, that is adapted to open outwardly, the side edges of the wall 10 being connected with the side edges of the opening in the back of the section 2 by foldable pleated walls 11. A latch 12 is provided to latch the front wall 4 in folded position, and a latch 13 is provided to latch the back wall 10 in folded position, it being understood that when the wall 10 is in folded position light will be excluded from the interior of the box of the camera.

A ground glass plate wall 15 is supported in a frame 14 surrounding the opening in the back wall of the section 2, and a mirror 16 is attached to the inner face of the wall 10; thus when the film holder, the construction of which will be described hereinafter, is in the position shown in dotted lines in Fig. 1, the image, cast upon the ground plate 15 from the lens, will be observable in the mirror 16 through the opening at the top of the chamber formed by the walls 10 and 11. The camera may be accurately focused by observing the clarity of the reflection of the image on the reflector or mirror 16.

The film holder includes a back wall 17, and side walls 18, the ends of the back wall and of the side walls being curved to form segments of cylindrical cases for enclosing the film rolls. Curved cases 19 are hinged to the ends of the wall 17, the cases 19 completing the enclosing cases for the film rolls. The sections 19 are held from movement by latch devices 20, which devices may be moved to one position to restrain the pivoted movement between the sections 19 and to another position to permit the sections 19 to be folded outwardly for mounting and removing the film rolls.

In filling the camera, the back section 2 is removed, and the latches 20 released so as to give access to the film roll cases composed of the curved end sections of the wall 17 and of the curved sections 19, the film being arranged on a spool in the usual manner.

The unexposed film spool is mounted in the upper film roller case and the film protected by the usual backing paper drawn downwardly against the inner face of the wall 17, the ends of the film being connected with an empty film roller that is mounted on a stud shaft 21 which may be revolved by means of a wing finger handle 22 to roll the film from the end spool to the other in the usual manner. After the camera has been filled, the film case is placed in position within the box, wherein the film case is held so that a section of the film will be in exposure position at the back of the camera box intermediate the two film spools.

The stud shaft 21 has bearing in openings in the side walls of the camera box. Thus the film case is pivoted near its lower end in order that it may be swung out of exposure position, to the position indicated in dotted lines in Fig. 1, in which position it is latched so that the back of the camera box may be opened for the purpose of focusing the camera without exposing the film surface to the light.

The mechanism for swinging the film case out of exposure position includes a segmental rack 23 attached to the shaft 21. A rack bar 24 is arranged to mesh with the segmental rack 23, the rack bar 24 being arranged to slide in a case 25, attached to one side of the camera box. The end of the rack bar 25 extends outwardly from one side of the camera box and terminates in a finger piece 26 for manual engagement by the operator. When the rack bar 24 is moved inwardly, the shaft 21 will be rotated through the segmental rack connection, causing the film case to swing downwardly out of exposure position. When the rack bar 24 has been moved to its inner position, a pin 27, operating through a slot in the top of the case 25 is engaged by a latch pawl 28 pivoted to the top of the case 25, the latch pawl being operated to latched engagement by a spring 29. A torsional spring 30 is attached at one end to the case 25, and is wound around an end of the shaft 21 in such a way that when the rack bar 24 is released the shaft will be rotated in reversed direction and thereby raise the film holder to exposure position.

It will be understood that when the film holder is in the depressed position shown in dotted lines in Fig. 1, it will be protected from the light entering through the lens.

In order that the exposure may be made promptly upon the return of the film holder to exposure position, a shutter operated mechanism is provided that will operate immediately upon the return of the film holder to upright position. The operating mechanism includes the usual cable release 31, the end of the cable being supported in a bracket 32 at one side of the camera box. A shaft 33 is journaled in one side in the camera box, and at the other end in the bracket 34, secured to the inner face of the section 2 near the top end thereof. A lever arm 35 extends from the shaft 33 and terminates adjacent to the back wall of the film holder when the same is in upright position. The outer end of the shaft 33 carries an arm 36 that is in alinement with the end of the release cable 31. When the film holder is released and returns to exposure position, it snaps against the arm 35, rocking the shaft 33, and thereby moving the end of the arm 36 against the shutter release, thereby effecting the operation of the shutter.

In operating a camera including the present invention, after the film holder has been loaded in the manner hereinbefore described, the film holder is mounted in place in the camera box. When it is desired to make an exposure, by manipulating the rack bar 24, the film holder is carried to depressed position as shown in dotted lines in Fig. 1, in the bottom of the bellows section 5. The back wall 10 is folded outwardly and the shutter opened, the picture is reflected through the ground glass partition wall 15 onto the mirror or reflector 16, the camera being focused by the movement of the bellows section 6. After the proper focus has been attained, the back wall 10 is folded inwardly and latched in place, and the lens shutter closed, and the latch holding the film case in depressed position released by manipulation of the pawl 28. The film holder immediately is returned to exposure position and as an incident to the return, the shutter is operated to effect the exposure.

I am aware that the invention may be modified in certain particulars without departing from the spirit and scope of the invention. I do not limit myself, therefore, to the exact construction shown and described, but what I claim and desire to secure by Letters Patent is:

1. In a camera, the combination with a box and a movable bellows connected therewith, of a film support pivoted within the box and movable into and out of exposure position, a ground glass plate arranged to receive the lens image when the said film holder is out of exposure position, a movable wall, and a reflector on said wall for reflecting the image upon said ground glass plate.

2. In a camera, the combination of a box having a pivoted back wall, a ground glass plate between the back wall and the interior of the box, a reflector carried by said back wall to reflect images appearing upon the ground glass plate, a film holder pivoted to swing in the box between the camera lens and said ground glass plate, and means for moving said film holder.

3. In a camera, the combination with a box composed of separable sections, one of said sections having a hinged back wall, foldable walls between the back wall and the box, a ground glass plate closing the opening near the back wall of the box, a reflector device to reflect images appearing upon said ground glass plate supported by said back wall, a pivoted film support movable into position between the lens of the camera and said ground glass plate, manual means for moving said film support to one position, and a device for moving the film support to the other position.

4. In a camera, the combination with a camera box composed of separable sections, one of said sections having a hinged back wall, foldable walls between the back wall and the box, a ground glass plate closing the opening near the back wall of the box, a reflector device to reflect images appearing upon said ground glass plate supported by said back wall, a pivoted film support movable into position between the lens of the camera and said ground glass plate, manual means for moving said film support to one position, and means operated as an incident to the return movement of said film support to operate the shutter of the camera.

5. In a camera, the combination with a box, of a film support mounted therein, and movable into and out of exposure position, a ground glass plate arranged rearwardly from the film holder, means for swinging the film holder away from said ground glass plate, a device for returning the film holder to position in front of said ground glass plate, and a hinged wall adapted to fold outwardly and expose the ground glass plate.

GOLIAT DAVISON.